US008402881B2

(12) United States Patent
Sato et al.

(10) Patent No.: US 8,402,881 B2
(45) Date of Patent: Mar. 26, 2013

(54) INSERT CASTING STRUCTURE

(75) Inventors: Takashi Sato, Yamagata (JP); Giichiro Saito, Yamagata (JP)

(73) Assignees: Teikoku Piston Ring Co., Ltd., Tokyo (JP); Teipi Industry Co., Ltd., Sagae-shi (JP)

( * ) Notice: Subject to any disclaimer, the term of this patent is extended or adjusted under 35 U.S.C. 154(b) by 998 days.

(21) Appl. No.: 12/425,676

(22) Filed: Apr. 17, 2009

(65) Prior Publication Data

US 2009/0272261 A1 Nov. 5, 2009

(30) Foreign Application Priority Data

Apr. 30, 2008 (JP) ................................ 2008-118207

(51) Int. Cl.
*F16J 10/04* (2006.01)

(52) U.S. Cl. ...................................................... 92/169.2

(58) Field of Classification Search ................. 92/169.1, 92/169.2, 171.1

See application file for complete search history.

(56) References Cited

U.S. PATENT DOCUMENTS

| | | | | |
|---|---|---|---|---|
| 7,383,805 | B2 | 6/2008 | Michioka et al. | 123/193.2 |
| 2007/0012178 | A1 | 1/2007 | Takami et al. | 92/171.1 |
| 2007/0240652 | A1 | 10/2007 | Michioka et al. | 123/41.84 |

FOREIGN PATENT DOCUMENTS

| | | |
|---|---|---|
| JP | 8-290255 | 11/1996 |
| JP | 2004-209507 | 7/2004 |
| JP | 2005-194983 | 7/2005 |
| JP | 2007-16733 | 1/2007 |
| JP | 2007-321576 | 12/2007 |
| KR | 10-2008-0027927 | 3/2008 |
| KR | 10-2008-0027929 | 3/2008 |

OTHER PUBLICATIONS

European Search Report dated Aug. 12, 2009 issued in corresponding European patent Appln. No. 09251129.4.
Office Action dated Oct. 4, 2011 corresponding to Japanese Patent Application No. 2008-118207 with English translation.
Japanese Office Action mailed Apr. 17, 2012, in counterpart Japanese Application 2008-118207, with English Translation.
Notice of Grounds for Rejection issued on Oct. 19, 2012 in counterpart application No. 10-2009-0033651 from the Korean Intellectual Property Office with English translation (7 pages).

*Primary Examiner* — Michael Leslie
(74) *Attorney, Agent, or Firm* — Kratz, Quintos & Hanson, LLP

(57) ABSTRACT

Evaluation results are shown in Table 1. The embodiments 1-9 possess a high thermal conductivity and high bonding strength. However, the thermal conductivity has dropped in the comparative examples 1, 2 and 4 with a low surface area ratio and in the comparative example 3 with a high surface area ratio. The comparative example 2 with a low projection height has a low bonding strength, and the comparative example 3 with a high projection height has a drop in the thermal conductivity. The thermal conductivity has declined in the comparative example 1 with relatively few projections, and the thermal conductivity has declined in the comparative example 4 with many projections. The comparative example 5 with no projections and having a rough casting surface does not have sufficient bonding strength.

2 Claims, 3 Drawing Sheets

INSERT CASTING STRUCTURE

BACKGROUND OF THE INVENTION

1. Field of the Invention

The present invention relates to an insert casting structure in which a cylinder liner made of cast iron and having multiple projections on the outer circumferential surface is inserted within aluminum alloy through insert casting, and relates in particular to an insert casting structure possessing good thermal conductivity and bonding strength.

2. Description of the Related Art

Cylinder liners of cast iron are often mounted in a cylinder block of aluminum alloy in order to make the automobile engine compact and light weight. The following methods are known in the conventional art for manufacturing this type of cylinder block with cylinder liners. A cylinder liner is first set beforehand into the mold for casting the cylinder block. Casting material (aluminum alloy) is then poured into the mold. The outer circumference of the cylinder liner is enclosed by the aluminum alloy. In this case, improving the thermal conductivity of the insert casting structure where the cylinder liner and the cylinder block are bonded into a single piece is effective in improving engine performance.

Technology in the prior art for cylinder liners for insert casting is disclosed in Japanese Non-examined Patent Publication No. 2005-194983, U.S. Patent document No. 7,383,805 and in Japanese Non-examined Patent Publication No. 2004-209507. The technology disclosed in Japanese Non-examined Patent Publication No. 2005-194983 and U.S. Patent document No. 7,383,805 proposes improving the adherence and the bonding strength between the cylinder liner and the cylinder block by specifying fixed values for the height of projections, the number of projections and the projection area ratio on the outer circumferential surface of the cylinder liner. The technology disclosed in Japanese Non-examined Patent Publication No. 2004-209507 proposes improving the adherence and the thermal conductivity between the cylinder liner and the cylinder block, and making a thinner wall structure by using specific values for the arithmetic average roughness and developed length ratio of the outer circumferential surface of the cylinder liner. Moreover, thermal spraying of high thermal conductivity material such as aluminum alloy onto the casting surface of the cylinder liner is known as the conventional art for improving the thermal conductivity of the insert casting structure formed by inserting the cylinder liner within the aluminum alloy through insert casting.

The vicinity of the top dead center of the cylinder bore is subject to harsh thermal conditions in recent years due to engines with higher output and low fuel consumption. Moreover, the wall thickness between the cylinder bores must be made thinner to achieve a compact and low friction engine. The thermal conducting characteristics of the insert casting structure in which the cylinder liner is inserted within aluminum alloy through insert casting must be improved as a measure to reduce thermal effects. Making the wall thickness between the cylinder bores to thinner dimensions also requires that the cylinder liner be made thinner.

The technology disclosed in Japanese Non-examined Patent Publication No. 2005-194983 and U.S. Patent document No. 7,383,805 achieves high bonding strength but the thermal conductivity is inadequate. Moreover, maintaining the texture of the sliding surface and making the cylinder liner to thinner dimensions becomes difficult when the projection height is high. The technology disclosed in Japanese Non-examined Patent Publication No. 2004-209507 does not possess sufficient bonding strength between the outer circumferential surface of the cylinder liner and the aluminum alloy. The method of thermal spraying of high thermal conductivity material such as aluminum alloy onto the outer circumferential surface of the cylinder liner is high in terms of costs.

SUMMARY OF THE INVENTION

The present invention has an object of providing an insert casting structure that can be made to thinner dimensions and possessing high thermal conductivity and bonding strength.

According to an aspect of the present invention, the insert casting structure includes a cylinder liner made of cast iron and inserted within aluminum alloy through insert casting and having a plurality of projections on an outer circumferential surface of the cylinder liner, wherein when the thickness of a cast iron portion to the base of the projection is set as L1, and the thickness of an integrated piece made up of the cast iron portion and an aluminum alloy portion is set as L2, the thermal conductivity is 35 to 80 W/mK when measured under the condition of L1/L2=0.45.

The surface area of the outer circumferential surface of the cylinder liner containing the projections is preferably 140 to 230 percent of the surface area of the outer circumferential surface of a cylinder liner having no projections. The thermal conductivity will drop and the bonding strength might decrease at a surface area ratio below 140 percent. The insert casting characteristics will deteriorate and the thermal conductivity will decrease at a surface area ratio higher than 230 percent.

The height of projections is preferably 0.2 to 0.7 mm and the number of projections is preferably 70 to 150 per $cm^2$. Sufficient bonding strength cannot be obtained at a projection height below 0.2 mm even if there are many projections. At a projection height exceeding 0.7 mm, making a thin-walled cylinder liner becomes difficult and the thermal conductivity will drop. When the number of projections is less than 70 per $cm^2$, then the thermal conductivity will drop, and at more than 150 per $cm^2$, the thermal conductivity will drop.

The wall thickness of the cylinder liner is preferably 1.5 to 2.3 mm after finishing of the inner circumferential surface of the cylinder liner. At a wall thickness below 1.5 mm, the cast iron texture for good sliding characteristics on the inner circumferential surface of the cylinder liner cannot be obtained. A thickness of 2.3 mm or less is required for attaining a thin-walled cylinder liner.

The present invention improves engine performance by providing high thermal conductivity and bonding strength. Moreover, the distance between the cylinder bores can be shortened and the cylinder block made more compact because thin walls (thickness: 2.3 mm or less) can be formed after finishing of the inner circumferential surface of the cylinder liner. If the distance between the cylinder bores is the same as the conventional dimensions, then the aluminum alloy section can be made thicker to allow forming a cooling cavity.

BRIEF DESCRIPTION OF THE DRAWINGS

Preferred embodiments of the present invention will be described in detail based on the followings, wherein.

DETAILED DESCRIPTION OF THE PREFERRED EMBODIMENTS

Figure 1:
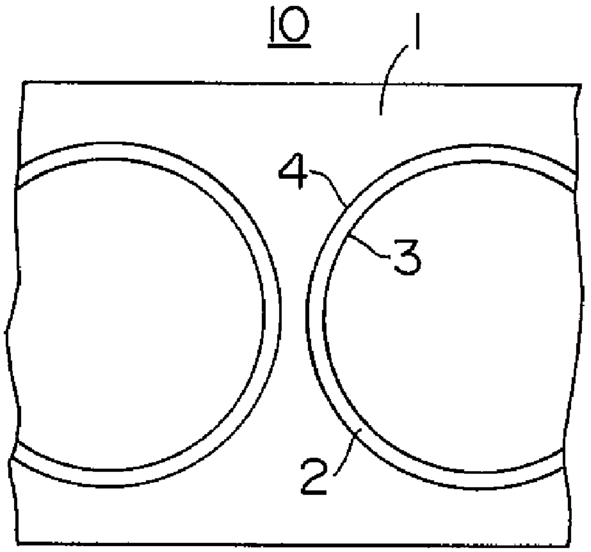
FIG. 1 is a drawing showing an embodiment of the insert casting structure of the present invention, and is a plan view showing a portion of the cylinder block where the cylinder liner is installed.
Figure 2:
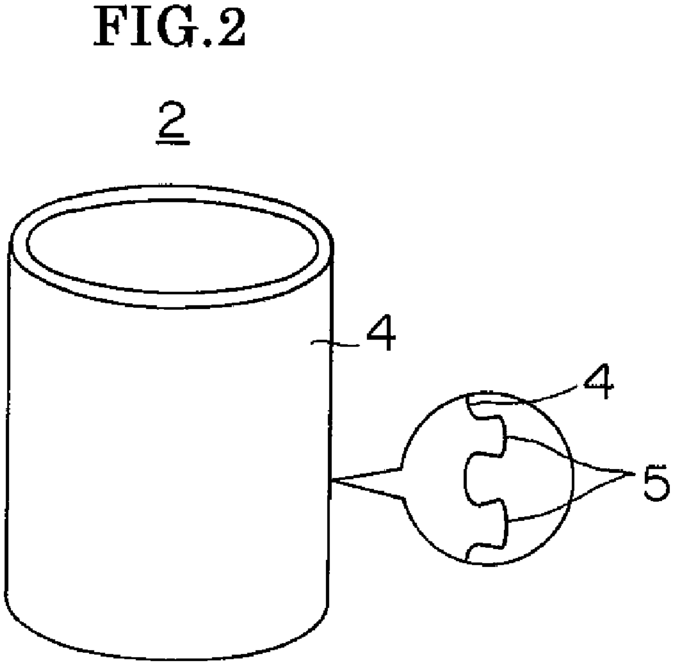
FIG. 2 is a perspective view showing the cylinder liner.

FIG. 1 shows a portion of a cylinder block where a cylinder liner is installed. FIG. 2 shows the cylinder liner. In view of the light weight and cost aspects, the material of the cylinder block 1 is for example an aluminum alloy specified in Japanese Industrial Standard (JIS) ADC10 (related United States Standard, ASTM A380.0), or an aluminum alloy specified in JIS ADC12 (related United States Standard, ASTM A383.0). In view of the wear resistance, scuffing resistance and workability characteristics, the material of the cylinder liner 2 is for example a cast iron specified in Japanese Industrial Standard (JIS) FC230. A typical composition of the cast iron is as follows:

T.C: 2.9-3.7 (mass %, the same hereafter)
Si: 1.6-2.8
Mn: 0.5-1.0
P: 0.05-0.4
Remainder: Fe Chromium 0.05-0.4 mass %, boron 0.03-0.08 mass %, and/or copper 0.3-0.5 mass % may be added as required.

The cylinder liner 2 is installed in the cylinder block 1. The inner circumferential surface 3 of the cylinder liner 2 forms a cylinder bore. In other words, the cylinder liner 2 is set beforehand into a mold for casting the cylinder block, and by filling molten aluminum alloy into the mold, an insert casting structure 10 in which the cylinder liner 2 made of cast iron is inserted in and bonded integrally to the cylinder block 1 made of aluminum alloy is produced. The inner circumferential surface 3 of the cylinder liner 2 is surface-finished to a wall thickness of 1.5-2.3 mm when complete.

Figures 3A, 3B, 3C:
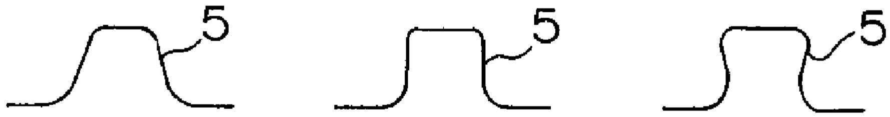
FIG. 3A is a view showing a projection shape.
FIG. 3B is a view showing another projection shape.
FIG. 3C is a view showing still another projection shape.

Multiple projections 5 are formed on the outer circumferential surface 4 of the cylinder liner 2. There are no particular restrictions on the shape of the projection 5. For example, as shown in FIG. 3A-FIG. 3C, the projection may utilize a trapezoidal shape (FIG. 3A), a square shape (FIG. 3B) or a constricted shape (thick tip section, thin middle section) (FIG. 3C).

The surface area of the outer circumferential surface 4 of the cylinder liner 2 containing the projections 5 is 140-230 percent of the surface area of the outer circumferential surface of a cylinder liner that does not contain projections. Moreover, the height of the projections 5 is 0.2-0.7 mm, and the number of the projections 5 is 70-150 per cm$^2$.

The projection area ratio is preferably 10-50 percent. The projection area ratio is calculated as a ratio of the total cross sectional area of the projections 5 at a height position of 0.2 mm from the base of the projections 5 in the projections 5 which exist in unit area, to the unit area. That is, the projection area ratio corresponds to the total area of the projection cross sectional area in unit area in the plane of a height position of 0.2 mm from the base of the projections 5. The bonding strength drops at a projection area ratio below 10 percent. At a projection area ratio exceeding 50 percent, the projections join together and the casting properties deteriorate, voids occur and the adherence deteriorates, and the thermal conductivity declines.

The cylinder liner 2 is produced by the centrifugal casting method. The centrifugal casting method efficiently produces the cylinder liner 2 having the multiple uniform projections 5 on the outer circumferential surface 4. The method for producing the cylinder liner 2 is described next.

Diatomaceous earth with an average grain size of 0.002-0.02 mm, bentonite (binder), water, and surfactant are mixed in specified proportions to form the mold coating material. The mold coating material is sprayed on the inner surface of the mold (metal mold) rotating while heated to 200-400 degrees C., to form the mold coating layer on the inner surface of the mold. The thickness of the mold coating layer is 0.5-1.1 mm. The water vapor bubbles generated inside the mold coating layer by the effect from the surfactant, form multiple recesses in the mold coating layer. After the mold coating layer dries, the molten cast iron is provided into the rotating mold. The molten metal fills into the recesses in the mold coating layer at this time to form multiple uniform projections. After the molten metal hardens and forms a cylinder liner, the cylinder liner is taken out from the mold along with the mold coating layer. Blast processing removes the mold coating layer to produce the cylinder liner containing an outer circumferential surface with the uniform multiple projections.

Results (See Table 1) from evaluating the thermal conductivity and the bonding strength of the insert casting structure 10 in which the cylinder liner 2 made of cast iron and containing the multiple projections 5 on the outer circumferential surface 4 is inserted in and bonded integrally to aluminum alloy through insert casting are described next.

The composition of the cast iron forming the cylinder liner used in the tests for both the embodiments and the comparative examples was as follows:

T.C: 2.9-3.7 (mass %, the same hereafter)
Si: 1.6-2.8
Mn: 0.5-1.0
P: 0.05-0.4
Cr: 0.05-0.4
Remainder: Fe The cylinder liners in the embodiments 1-9 and the comparative examples 1-4 were fabricated by the above described production method. The cylinder liner of the comparative example 5 was produced by the centrifugal casting method using the following production method.

Silica sand with an average grain size of 0.05-0.5 mm, silica flower with an average grain size of 0.1 mm or less, bentonite (binder), and water are mixed in specified proportions to form the mold coating material. The mold coating material is sprayed on the inner surface of the mold (metal mold) rotating while heated to 200-400 degrees C., to form the mold coating layer on the inner surface of the mold. The thickness of the mold coating layer is 1 mm. After the mold coating layer dries, the molten cast iron is provided into the rotating mold. After the molten metal hardens to form a cylinder liner, the cylinder liner is taken out from the mold along with the mold coating layer. Blast processing removes the mold coating layer to produce the cylinder liner containing an outer circumferential surface of a specified roughness.

Figure 4A:
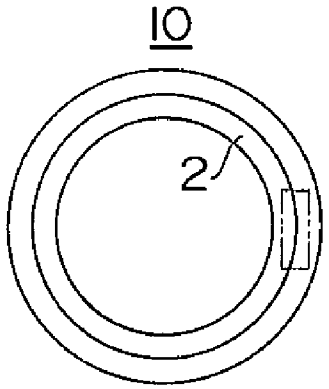
FIG. 4A is a plan view showing the insert casting structure for fabricating the test piece.

The cylinder liner 2 made of cast iron was inserted integrally within aluminum alloy through insert casting to produce the insert casting structure 10 for the tests (See FIG. 4A).

The aluminum alloy utilized in the tests was aluminum alloy specified in JIS ADC12 for both the embodiments and the comparative examples.

1. Thermal Conductivity

Figure 4C:
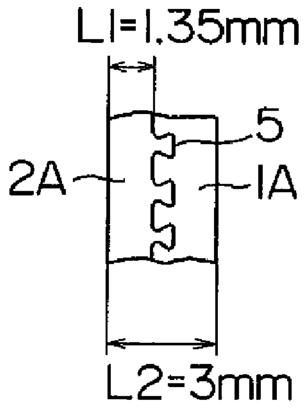
FIG. 4C is a drawing showing a portion of the test piece.
Figure 4B:
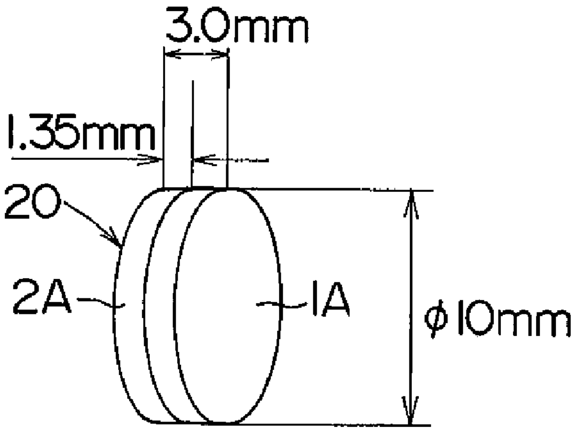
FIG. 4B is a perspective view showing the test piece that was cut out from the insert casting structure.
Figure 5:
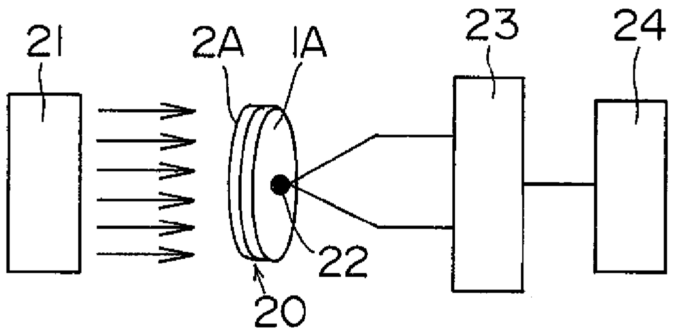
FIG. 5 is a drawing showing the method for measuring the thermal conductivity.

The thermal conductivity was found by the laser flash method. As shown in FIG. 4A though FIG. 4C, a test piece 20 was cut out from the insert casting structure 10 so that L1/L2 was equal to 0.45 when the thickness of a cast iron portion 2A to the base of the projection 5 was set as L1, and the thickness of an integrated piece made up of the cast iron portion 2A and an aluminum alloy portion 1A was set as L2. The chain double-dashed line as shown in FIG. 4A shows the cut-out line. The test piece 20 was in other words cut out from the insert casting structure 10 so that the outer diameter was 10 mm, the thickness of the cast iron portion 2A to the base of the projection 5 was 1.35 mm, and the thickness of the integrated piece made up of the cast iron portion 2A and the aluminum alloy portion 1A was 3 mm. The thermal conductivity was calculated from the thickness of the test piece 20 by measuring the time from the start of laser irradiation until heat was conveyed to the rear surface of the test piece 20. In FIG. 5, the reference numeral 20 denotes the test piece, 21 denotes a laser device, 22 denotes a thermocouple, 23 denotes a direct current amplifier, and 24 denotes a recorder. The required thermal conductivity is 35-80 W/mK.

2. Bonding Strength

Figure 6:
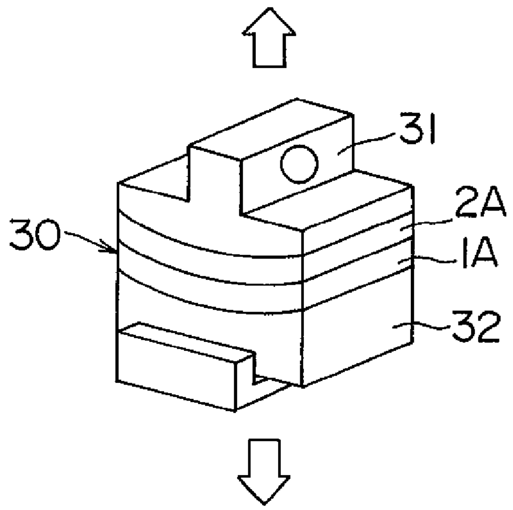
FIG. 6 is a drawing showing the method for measuring the bonding strength.

A test piece 30 (20 mm×20 mm) (See FIG. 6) was fabricated from the insert casting structure 10. Specialty jigs 31, 32 were bonded with adhesive respectively to the cast iron portion 2A and the aluminum alloy portion 1A. The test piece 30 was pulled in the direction of the arrow in the tension tester, and the strength when the cast iron portion 2A and the aluminum alloy portion 1A were separated from each other was set as the bonding strength. The bonding strength is preferably 3 Mpa or more.

3. Height of Projections

The height of the projections on the cylinder liner 2 was measured with a depth dial gage. The required height of projections is 0.2-0.7 mm.

4. Number of Projections

Contour diagrams of the projections at a height position of 0.2 mm from the base of the projections 5 were found by using a non-contact three-dimensional laser contour measuring device. The number of closed contour lines within a range of 10 mm×10 mm was set as the number of projections formed per unit area (1 $cm^2$). The required number of projections is 70-150 per $cm^2$.

5. Surface Area Ratio

Contour diagrams of the projections at a height position of 0.2 mm from the base of the projections 5 were found by using a non-contact three-dimensional laser contour measuring device. The projection area ratio B was found from the total surface area of the closed contour line sections within a range of 10 mm×10 mm. When the number of projections was set as N, the average height of the projections was set as H mm, and further the projections were assumed to be a cylindrical column with a fixed cross sectional area, then the percentage A (percent) of surface area of the outer circumferential surface including projections of the cylinder liner with projections relative to the surface area of the outer circumferential surface of the cylinder liner without projections was found by the following formula. As already described, the projection area ratio B was calculated as a ratio of the total cross sectional area of the projections 5 at a height position of 0.2 mm from the base of the projection 5 in the projections 5 which exist in unit area, to the unit area. The required surface area ratio A is 140-230 percent.

$$A=35.45\times(B\times N)^{1/2}\times H+100 \quad (1)$$

Figure 7:
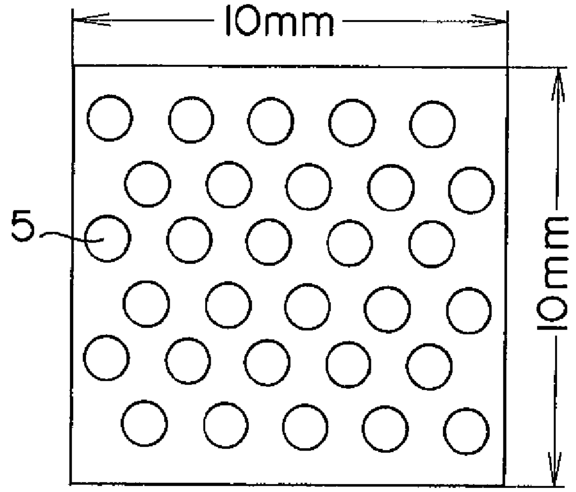
FIG. 7 is a drawing for explaining the method for calculating the surface area ratio.

The above formula (1) was calculated as follows. In FIG. 7, when set so that the average radius of the projections is R mm, the average height of the projections is H mm, the number of the projections is N, and the projection area ratio is B:

$$\pi\times R^2\times N=100\times B$$

$$R^2=100\times B/(\pi\times N)$$

$$R=10\times(B/(\pi\times N))^{1/2}$$

$$\text{Area of the side surface of projection}=2\times\pi\times R\times H\times N$$

$$=2\times\pi\times 10\times(B/(\pi\times N))^{1/2}\times H\times N$$

$$=20\times\pi^{1/2}\times(B\times N)^{1/2}\times H$$

$$=35.45\times(B\times N)^{1/2}\times H$$

$$\text{Area of } 10\text{ mm}\times 10\text{ mm}=100\text{ mm}^2$$

$$\text{Surface area ratio } A\,(\%)=35.45\times(B\times N)^{1/2}\times H+100$$

Evaluation results are shown in Table 1. The embodiments 1-9 possess a high thermal conductivity and high bonding strength. However, the thermal conductivity has dropped in the comparative examples 1, 2 and 4 with a low surface area ratio and in the embodiment 3 with a high surface area ratio. The comparative example 2 with a low projection height has a low bonding strength, and the comparative example 3 with a high projection height has a drop in the thermal conductivity. The thermal conductivity has declined in the comparative example 1 with relatively few projections, and the thermal conductivity has declined in the comparative example 4 with many projections. The comparative example 5 with no projections and having a rough casting surface does not have sufficient bonding strength.

TABLE 1

| | | Surface Area Ratio % 140-230 | Number of Projections Number/$cm^2$ 70-150 | Projection Height mm 0.2-0.7 | Projection Height Average Value mm | Projection Area Ratio % 10-50 | Thermal Conductivity W/mK 35-80 | Bonding Strength Mpa 3 and more |
|---|---|---|---|---|---|---|---|---|
| Embodiment | 1 | 141 | 150 | 0.2-0.4 | 0.3 | 10 | 40 | 7 |
| | 2 | 181 | 70 | 0.3-0.7 | 0.5 | 30 | 60 | 20 |
| | 3 | 209 | 125 | 0.3-0.7 | 0.5 | 30 | 78 | 22 |
| | 4 | 176 | 75 | 0.3-0.6 | 0.45 | 30 | 50 | 18 |
| | 5 | 163 | 100 | 0.2-0.6 | 0.4 | 20 | 45 | 18 |
| | 6 | 140 | 105 | 0.2-0.5 | 0.35 | 10 | 35 | 10 |
| | 7 | 230 | 75 | 0.4-0.7 | 0.6 | 50 | 65 | 23 |

TABLE 1-continued

| | | Surface Area Ratio % 140-230 | Number of Projections Number/$cm^2$ 70-150 | Projection Height mm 0.2-0.7 | Projection Height Average Value mm | Projection Area Ratio % 10-50 | Thermal Conductivity W/mK 35-80 | Bonding Strength Mpa 3 and more |
|---|---|---|---|---|---|---|---|---|
| | 8 | 142 | 70 | 0.3-0.6 | 0.45 | 10 | 37 | 12 |
| | 9 | 141 | 105 | 0.2-0.35 | 0.25 | 20 | 37 | 3 |
| Comparative Example | 1 | 137 | 55 | 0.3-0.6 | 0.45 | 10 | 27 | 10 |
| | 2 | 134 | 150 | 0.1-0.35 | 0.25 | 10 | 34 | 1 |
| | 3 | 238 | 70 | 0.7-1.0 | 0.85 | 30 | 23 | 30 |
| | 4 | 135 | 152 | 0.2-0.35 | 0.25 | 10 | 30 | 4 |
| | 5 | — | 0 | Maximum Roughness 0.2-0.3 | | 3 | 40 | 0.8 |

The invention claimed is:

1. An insert casting structure comprising a cylinder liner made of cast iron and inserted within aluminum alloy through insert casting and having a plurality of projections on an outer circumferential surface of the cylinder liner, wherein a surface area of the outer circumferential surface of the cylinder liner having the projections is 140 to 230 percent of the surface area of the outer circumferential surface of a cylinder liner having no projections, the surface area ratio is calculated by the following formula A when set so that an average height of projections is H mm, a number of projections is N, and a projection area ratio is B, $$A(\%)=35.45\times(B\times N)^{1/2}\times H+100,$$

a height of projections is 0.2 to 0.7 mm, a number of projections is 70 to 150 per $cm^2$, and when the thickness of a cast iron portion to the base of the projection is set as L1, and the thickness of an integrated piece made up of the cast iron portion and an aluminum alloy portion is set as L2, the thermal conductivity is 35 to 80 W/mK when measured under the condition of L1/L2=0.45.

2. The insert casting structure as claimed in claim 1, wherein the wall thickness of the cylinder liner is 1.5 to 2.3 mm after finishing of the inner circumferential surface of the cylinder liner.

* * * * *